(No Model.)

L. LEMIEUX.
SCREW CUTTING TOOL.

No. 555,869. Patented Mar. 3, 1896.

WITNESSES:
Chas. E. Poensgen.
E. Wolff

INVENTOR:
Louis Lemieux.
BY
Hauff & Hauff,
ATTORNEYS.

UNITED STATES PATENT OFFICE.

LOUIS LEMIEUX, OF NEW YORK, N. Y., ASSIGNOR TO LOUIS HAAS, OF SAME PLACE.

SCREW-CUTTING TOOL.

SPECIFICATION forming part of Letters Patent No. 555,869, dated March 3, 1896.

Application filed June 12, 1895. Serial No. 552,551. (No model.)

*To all whom it may concern:*

Be it known that I, LOUIS LEMIEUX, a citizen of Canada, residing at New York, in the county and State of New York, have invented new and useful Improvements in Screw-Cutting Tools, of which the following is a specification.

The object of this invention is to simplify the construction of screw-cutting tools, as also to secure accuracy in the position and operation of the tool parts; and the invention resides in the novel features of construction set forth in the following specification and claim and illustrated in the annexed drawings, in which—

Figure 1:
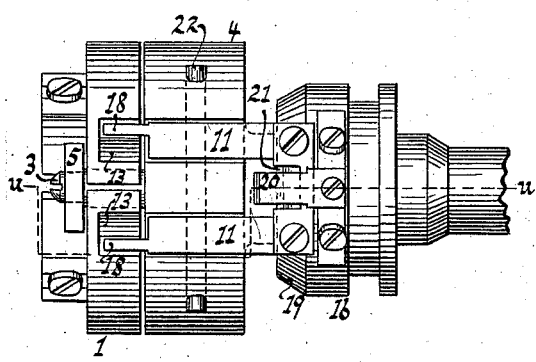
Figure 2:
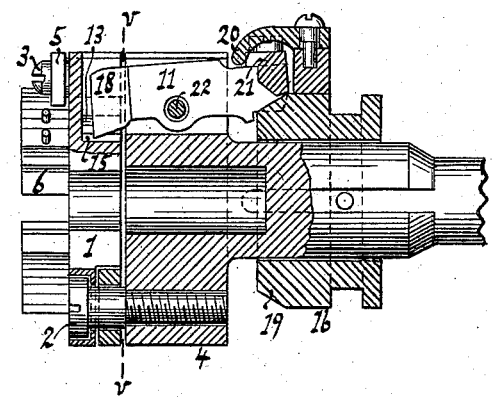
Figure 3:
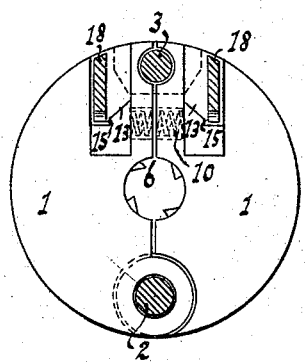

Figure 1 is a plan view of a screw-cutting tool. Fig. 2 is a section along *u u*, Fig. 1. Fig. 3 is a section along *v v*, Fig. 2.

The tool comprises the jaws 1, hinged at 2, so as to open and close, a stop-pin 3, projecting from the stock 4, limiting the movement of the jaws so that their line of juncture will come across or intersect the axis of the stock. The stop-pin 3 has a keeper or plate 5, which rests against the faces of the jaws, so as to keep said faces in alignment, thereby insuring accuracy of position and operation. The jaws are symmetrical, and each jaw has a cutter or cutters 6.

The spring 10 tends to force the jaws 1 apart, and to hold the jaws together or closed during the cutting operation the holding or closing fingers 11 are provided. The fingers and jaws have interposed or contacting faces comprising inclined and locking portions.

The closing-fingers are shown in form of levers 11, and the jaws 1 have the faces with the inclined portions 13 and the locking portions 15. When the levers are moved to carry their end portions 18 outward or away from the axis of the stock, said portions 18, releasing the locking portions 15 and riding along the inclined portions 13, will allow the jaws to open, while the reverse motion of the levers will move the portions 18 along the face portions 13 to close the jaws, and the portions 18, then engaging the face portions 15, will cause the jaws to be locked.

The movement of collar 16, when slid toward the jaws, will cause the inclined portion 19 of said collar to actuate levers 11, so that their end portions 18 close and lock the jaws. When the collar 16 is slid or moved away from the jaws, the nose 20 on said collar strikes the connection or cross-head 21 between the levers 11 to move the latter into position for the release or opening of the jaws. The levers are shown with a fulcrum-pin 22, carried by stock 4.

Having thus described my invention, what I claim is—

The combination with two jaws of closing-fingers for said jaws, and faces interposed between the fingers and jaws and comprising inclined and locking portions for successively closing the jaws and then holding or locking the jaws in closed position, a stock for supporting the jaws, and a fulcrum for the fingers carried by the stock, substantially as described.

In testimony whereof I have hereunto set my hand in the presence of two subscribing witnesses.

LOUIS LEMIEUX.

Witnesses:
WM. C. HAUFF,
E. F. KASTENHUBER.